Oct. 17, 1933.  W. F. SCHRAMM  1,931,416
WINDROW OR BUNCHING ATTACHMENT FOR MOWERS
Filed April 18, 1931  4 Sheets-Sheet 2

Inventor
W. F. Schramm
By Watson E. Coleman
Attorney

Oct. 17, 1933.    W. F. SCHRAMM    1,931,416
WINDROW OR BUNCHING ATTACHMENT FOR MOWERS
Filed April 18, 1931    4 Sheets-Sheet 3

Patented Oct. 17, 1933

1,931,416

UNITED STATES PATENT OFFICE 1,931,416

WINDROW OR BUNCHING ATTACHMENT FOR MOWERS

William F. Schramm, Woonsocket, S. Dak.

Application April 18, 1931. Serial No. 531,231

4 Claims. (Cl. 56—183)

This invention relates to a windrow or bunching attachment for a mower of any type, and has for one of its objects to provide an attachment of this character which shall embody a chute adapted to extend upwardly and rearwardly from the finger bar of a mower, hereinafter referred to as the longitudinal chute, a chute located at the rear end of and extending transversely of the longitudinal chute with its discharge end located at the left and inner side of said chute, a conveyor adapted to carry the cut crop rearwardly of the longitudinal chute and discharge it therefrom into the transverse chute, a conveyor adapted to carry the cut crop along the transverse chute and expel it therefrom through the discharge end thereof, and means by which the conveyor of the transverse chute may be operated continuously to effect the depositing of the cut crop upon the ground in a windrow or operated intermittently to effect the depositing of the cut crop upon the ground in relatively spaced bunches.

The invention has for a further object to provide a windrow or bunching attachment of the character stated wherein the longitudinal chute shall be adapted to be secured at its front end to the finger bar of the mower, wherein the transverse chute shall be supported from the longitudinal chute, and wherein the chutes shall be supported at the center of their load by a caster wheel so as to permit the mower and attachment to readily negotiate a turn.

The invention has for a further object to provide a windrow or bunching attachment of the character stated wherein the means for operating the conveyor of the transverse chute shall be under the control of the operator and readily actuated by him to effect the continuous or intermittent operation of the conveyor.

The invention has for a further object to provide a windrow or bunching attachment of the character stated wherein the conveyor of the longitudinal chute shall be adapted to prevent the grass being blown away from the mower when the machine is travelling in the direction of the wind, and which shall also be adapted to prevent the grass from lodging in the mower.

The invention has for a further object to provide a windrow or bunching attachment of the character stated wherein the front end of the conveyor of the longitudinal chute shall be adjustable vertically with respect to the bottom of the chute so as to permit the attachment to windrow or bunch short or long grass.

The invention has for a further object to provide a windrow or bunching attachment of the character stated which shall provide novel means through the medium of which the conveyors may be driven from the power take-off shaft of any well-known tractor.

With the foregoing and other objects in view, the nature of which will appear as the description proceeds, the invention consists in the construction, combination and arrangement of parts hereinafter fully described and claimed, and illustrated in the accompanying drawings, wherein:—

Figure 6 is a sectional view taken on the vertical plane indicated by the line 6—6 of Figure 3.

Figure 7 is a sectional view taken on the inclined plane indicated by the line 7—7 of Figure 3, and Figure 8 is a sectional view taken on the horizontal plane indicated by the line 8—8 of Figure 6.

Figure 1:
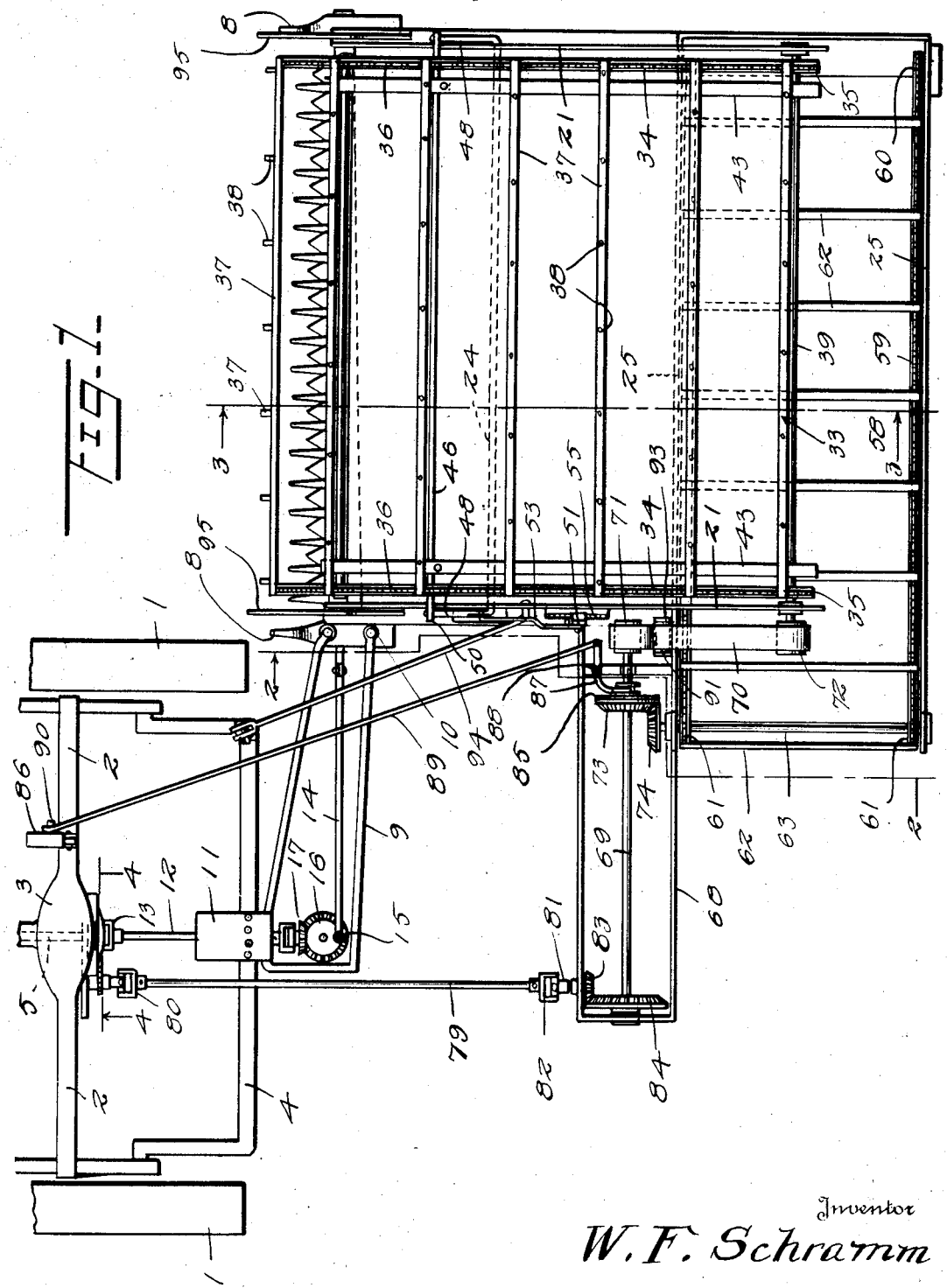
Figure 1 is a top plan view of the windrow or bunching attachment applied to a tractor propelled and operated mower.
Figure 2:
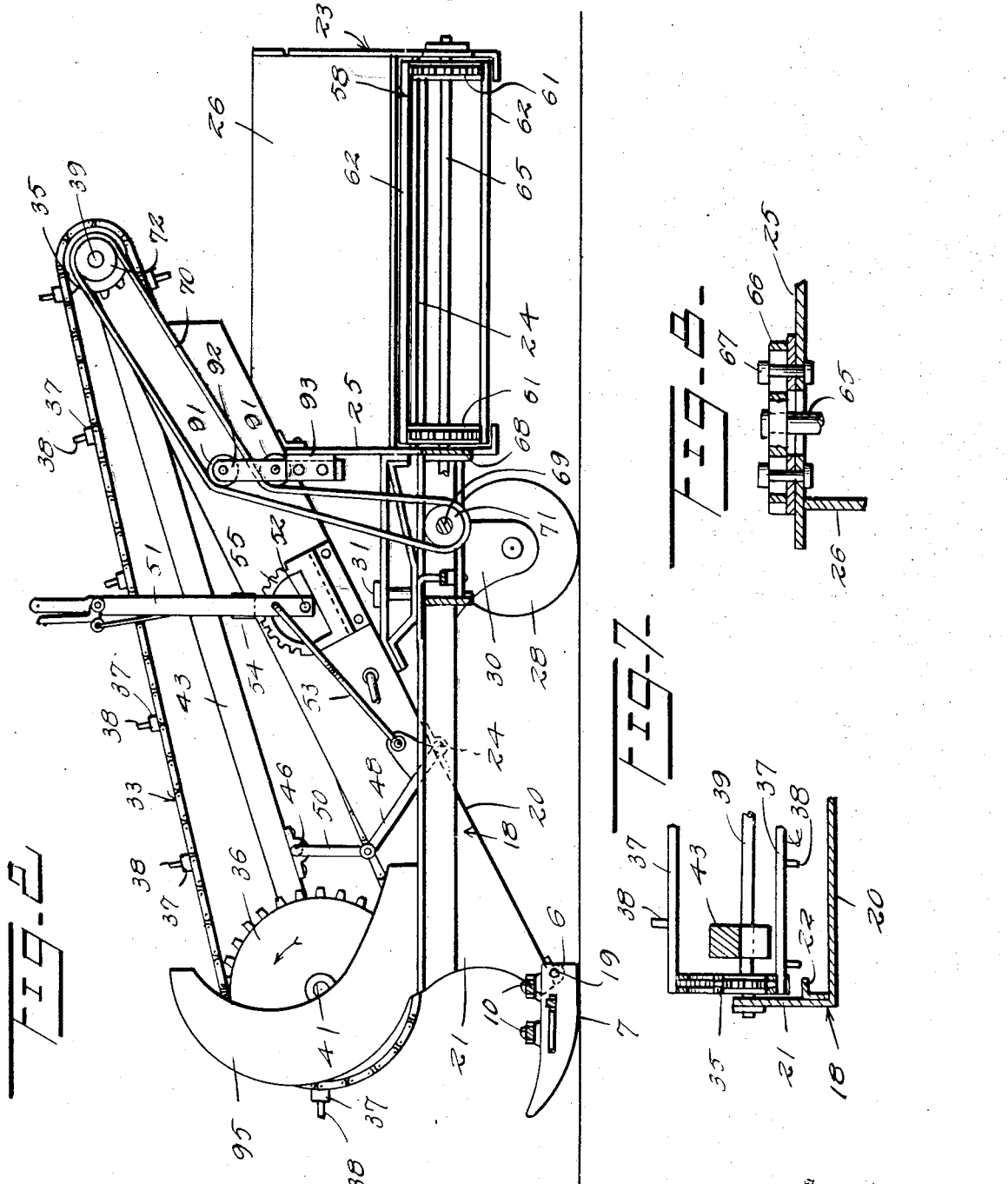
Figure 2 is a sectional view taken on the vertical planes indicated by the line 2—2 of Figure 1.
Figure 3:
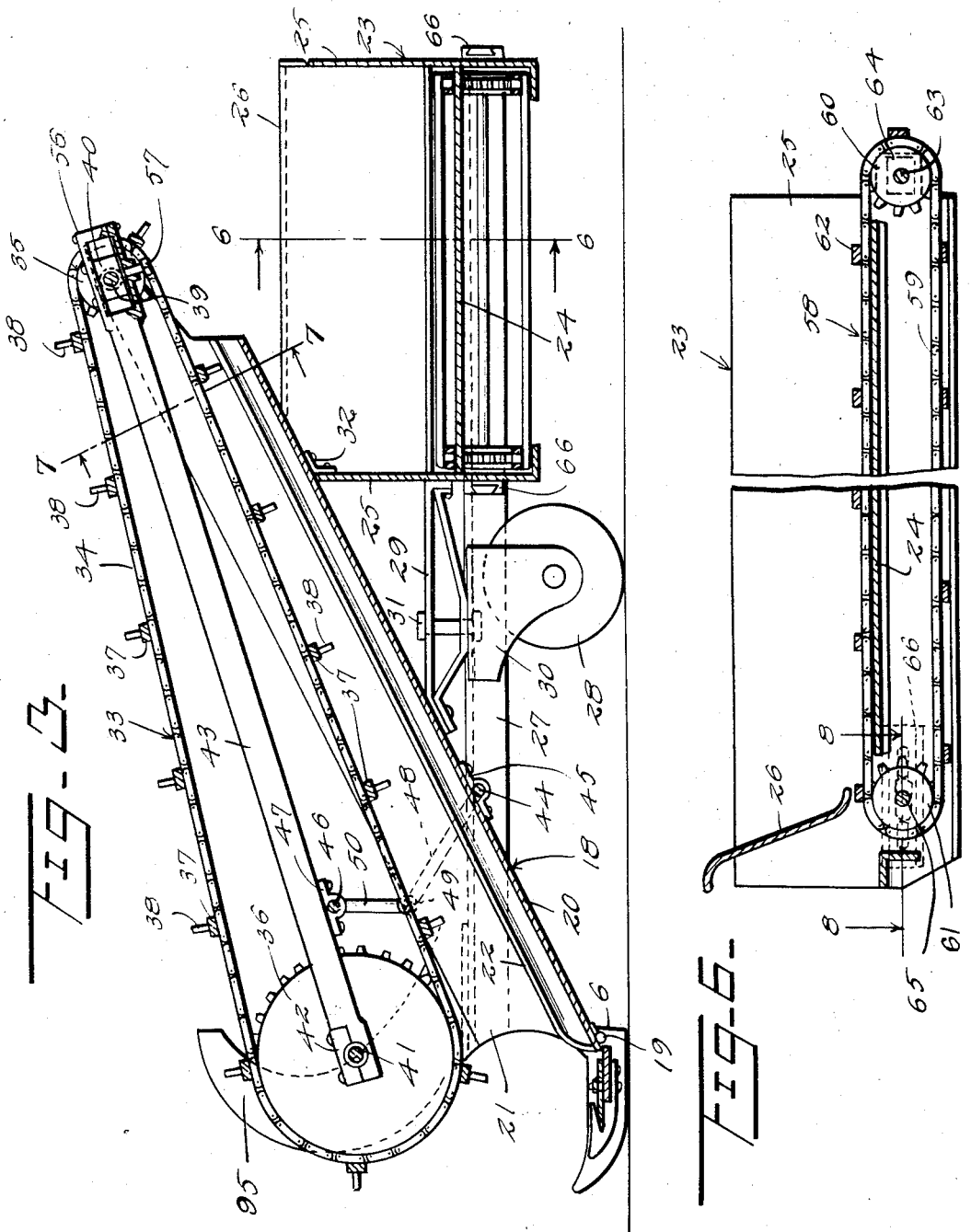
Figure 3 is a sectional view taken on the vertical plane indicated by the line 3—3 of Figure 1.
Figure 4:
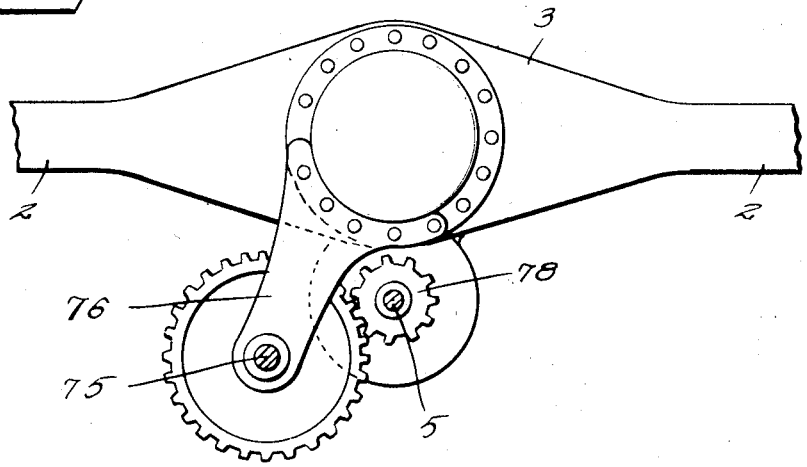
Figure 4 is a sectional view taken on the vertical plane indicated by the line 4—4 of Figure 1.
Figure 5:
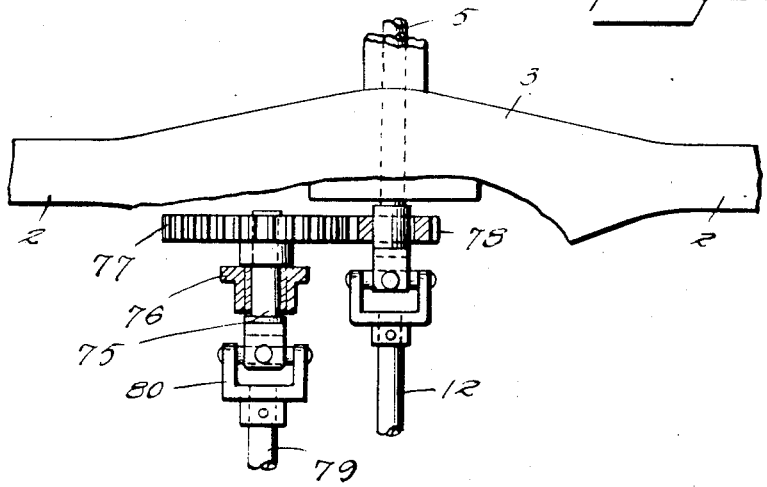
Figure 5 is a view partly in plan and partly in section of the power take-off means of the tractor and the means for establishing driving connections between the power take-off means and the mower and conveyors.

Referring in detail to the drawings, 1 designates the driving wheels, 2 the rear axle housings, 3 the differential housing, 4 the draw bar and 5 the power take-off shaft of a tractor. 6 designates the finger bar, 7 the cutter bar and 8 the shoes of a mower which extends laterally from the rear end of the tractor. The finger bar 6 is secured to the draw bar 4 by a frame 9 to which the inner shoe 8 of the mower is pivotally connected, as at 10, and which is secured to a bearing 11 fixed to the draw bar 4.

A shaft 12 is journaled in the bearing 11 and connected to a universal joint 13 carried by the power take-off shaft 5, and a pitman 14 connected to the cutter bar 7 and to the shaft 12, establish a driving connection between the power take-off shaft and the cutter bar. The pitman 14 is connected to a wrist pin 15 carried by a gear 16 journaled on the frame 9 and meshing with a gear 17 fixed to the shaft 12.

The form of tractor, mower and mower operating means illustrated, are of well-known construction and employed by way of example merely to illustrate a tractor, mower and mower operating means of any suitable character.

The windrow or bunching attachment comprises a chute 18 which extends upwardly and rearwardly from the finger bar 6 of the mower and which is hinged at its front end, as at 19, to the finger bar so as to permit the mower and the attachment to move relatively about a horizontal axis. The chute 18 comprises a bottom wall 20 and side walls 21, and is fully open at its front and rear ends. The side walls 21 are reinforced by angle bars 22 extending longitudinally thereof. A chute 23 is located at the rear end of and extends transversely of the chute 18, the latter being the longitudinal chute and the former being the transverse chute hereinafter referred to. The transverse chute 23 comprises a bottom wall 24, side walls 25 and an outer end wall 26, the chute being fully open at its inner end. The transverse chute 23 is mounted upon and secured to longitudinal beams 27 secured to the side walls 21 of the longitudinal chute 18, and the chutes are supported at the center of the load by a ground contacting caster wheel 28.

A bracket 29 located below the longitudinal chute 18 and resting upon the frame 30 of the caster wheel 28, is secured to the bottom wall 20 of said chute and to the front side wall 25 of the transverse chute 28, and the vertical axis 31 of the caster wheel is journaled in the bracket. A bracket 32 secured to the bottom wall 20 of the longitudinal chute 18 and to the front side wall 25 of the transverse chute 23, cooperates with the beams 27 and bracket 29 in securing the chutes together.

The rear end of the longitudinal chute 18 overlies the transverse chute 23 so as to permit cut crop to be discharged from the longitudinal to the transverse chute. The cut crop is carried from the mower through the longitudinal chute 18 and into the transverse chute 23 by a conveyor 33 which is in effect a caterpillar reel. The conveyor 33 comprises sprocket chains 34 extending longitudinally of the longitudinal chute 18 and passing about rear sprocket wheels 35 and front sprocket wheels 36, and it also comprises slats 37 extending transversely of the chute and terminally secured to the sprocket chains and provided with fingers 38. The rear sprocket wheels 35 are fixed to a shaft 39 which extends transversely of the upper end of the longitudinal chute 18 and which is journaled in bearings 40 carried by the corresponding ends 21 of the chute. The front sprocket wheels 36 are larger than the rear sprocket wheels 35, and are fixed to a shaft 41 extending transversely of the lower end of the longitudinal chute 18. This shaft is journaled in bearings 42 on the lower ends of arms 43 which extend longitudinally of the longitudinal chute 18 and which are pivotally connected at their upper ends to the shaft 39.

A rockable connection between the arms 43 and shaft 39 permits the front end of the conveyor 33 to be adjusted vertically so as to adapt the windrow or bunching attachment for long or short grass. Means through the medium of which the conveyor 33 may be adjusted and secured in adjusted position comprises a shaft 44 extending transversely of the lower side of the longitudinal conveyor 28 and journaled in bearings 45 secured to the conveyor, a shaft 46 extending transversely of the lower sides of the arms 43 journaled in bearings 47 fixed to the arms, and toggle arms 48 fixed to the ends of the shaft 44 and pivotally connected, as at 49, to toggle arms 50 fixed to the ends of the shaft 46. This means also comprises a lever 51 pivoted, as at 52, to the inner side wall 21 of the longitudinal chute 18, and a link 53 secured to the lever and to the innermost of the toggle arms 48, together with a latch 54 carried by the lever and engaging a notched sector 55 secured to said side of this chute. This means is such that the rocking of the lever 51 in one direction results in the upward adjustment of the front end of the conveyor 33, and the rocking of the lever in the opposite direction results in the downward adjustment of the front end of the conveyor, the conveyor being secured in adjusted position by engaging the latch 54 with the notched sector 55.

The front end of the conveyor 33 is located directly above the mower, and the conveyor is operated to cause its lower run to travel rearwardly, with the result that the slats 37 will contact with the grass being cut and direct it rearwardly against the cutter bar 7 of the mower.

It will thus be seen that the conveyor 33 will prevent the grass being blown away from the mower when the machine is travelling in the direction of the wind and will prevent the grass from lodging in the mower. After the grass has been cut the conveyor 33 carries it upwardly through the longitudinal chute 18 and discharges it from this chute into the transverse chute 23. The bearings 40 are mounted in guides 56 for adjustment longitudinally of the longitudinal chute 18 in order to permit slack in the chains 34 to be taken up. The guides 56 are secured to the upper ends of the side walls 21 of this conveyor and the bearings 40 are secured in adjusted position by set screws 57.

The transverse chute 23 is provided with a conveyor 58 which comprises sprocket chains 59 extending longitudinally of the chute and passing about inner sprocket wheels 60 and outer sprocket wheels 61. The conveyor 58 also comprises slats 62 extending transversely of the transverse chute 23 and terminally secured to the sprocket chains 59. The front sprocket wheels 60 are mounted upon a shaft 63 which is journaled in bearings 64 secured to the side walls 25 of the transverse chute 23. The rear sprocket wheels 61 are mounted upon a shaft 65 which is journaled in bearings 66 secured to the side walls 25 of the transverse chute 23 for adjustment longitudinally of the chute in order to permit any slack in the chains 59 to be taken up, the bearings 66 being secured in their adjusted position by bolts 67. The upper run of the conveyor 58 rests upon the bottom wall 24 of the transverse chute 23, and travels in the direction of the inner open end of the chute so as to deposit the cut crop upon the ground rearwardly of the tractor.

A frame 68 is secured to and extends inwardly from the longitudinal chute 18 and the transverse chute 23, and journaled in the frame and extending longitudinally thereof is a shaft 69. A belt 70 passing about a pulley 71 fixed to the outer end of the shaft 69 and a pulley 72 fixed to the inner end of the shaft 39, and a bevelled gear 73 mounted on the shaft 69 and meshing with the bevelled gear 74 fixed to the front end of the shaft 63 establish driving connections between the shaft 69 and the conveyors 33 and 38. The shaft 69 is driven from the power take-off shaft 5 of the tractor through the medium of a shaft 75 which is journaled in a bearing bracket 76 secured to the differential housing 3. The shaft 75 is connected to the take-off shaft 5 by a gear 77 fixed to the former and meshing with a pinion 78 fixed to the latter. A shaft 79 is connected to the shaft 75 by a universal joint 80 and extends from the shaft 75 to a shaft 81 journaled in the frame 68, the shaft 79 being connected to the shaft 81 journaled in the frame 68, the shaft 79 being connected to the shaft 81 by a universal joint 82, and the shaft 81 is connected to the shaft 69 by a bevelled pinion 83 fixed to the former and meshing with a bevelled gear 84 fixed to the latter. The universal connections 80 and 82 between the shafts 75, 79 and 81 permit the windrow or bunching attachment to move vertically with respect to the mower.

The gear 73 through the medium of which a driving connection is established between the power take-off driven shaft 69 and the shaft 63 of the transverse conveyor 58, is connected to the shaft 69 by a clutch 85 of any well-known or appropriate construction. The longitudinal conveyor 33 is continuously driven while the machine is in operation, and the clutch 85 permits the transverse conveyor 58 to be continuously or intermittently driven.

When the transverse conveyor 58 is continuously driven the cut crop is deposited in a window rearwardly of the tractor, and when this conveyor is intermittently driven the cut crop is deposited in relatively spaced bunches rearwardly of the tractor. Means by which the clutch 85 may be controlled to effect the continuous or intermittent operation of the transverse conveyor 58, comprises a foot lever 86 pivoted upon the right hand axle housing 2 of the tractor, an elbow lever 87 pivoted intermediate its ends, as at 88, upon the frame 68 and having one end thereof engaged with the clutch, and a link 89 connected to the lever 86 and to the other arm of the lever 87. The clutch 85 is then normally engaged thereby, and when engaged the transverse conveyor 58 is continuously driven. When it is desired to permit the transverse conveyor 58 to remain idle so as to accumulate a quantity of the cut crop in the transverse chute 23, the clutch 85 is thrown out or disengaged by depressing the lever 86 and holding it in such position. After the desired quantity of the cut crop has accumulated in the transverse chute 23, the lever 86 is released, to permit the clutch 85 to engage the pinion 83 with the shaft 69, with the result that the motion is imparted to the transverse conveyor 58 and the accumulated cut crop is deposited in the ground in a bunch or pile. After the depositing of the bunch or pile of cut crop, the clutch 85 is again disengaged when it is desired to continue the depositing of the cut crop in bunches or piles. The link 89 is connected to the lever 86 by a brake pin 90.

The belt 70 establishing a driving connection between the power take-off driven shaft 69 and the rear shaft 39 of the longitudinal conveyor 33, passes over guide rollers 91 journaled in an upright bar 92 carried by the bracket 93 fixed to the front side wall 25 of the transverse chute 23. A drag rod 94 fixed to the draw bar 4 and to the inner side wall 21 of the longitudinal chute 18 holds the window or bunching attachment, together with the mower, against any lateral play in an inward direction with respect to the tractor. The bar 92 is adjustable vertically to permit any slack in the belt 70 to be taken up. Guards 95 secured to the sides 21 of the longitudinal chute 18 and located outwardly of and close to the front sprocket wheels 36 of the conveyor 33 of this chute prevent the grass from clogging the sprocket wheels.

From the foregoing description, taken in connection with the accompanying drawings, it should be apparent that the windrow or bunching attachment may be readily connected to a mower and also readily connected to a tractor when such machine is used to pull and operate the mower. The pivotal connection between the attachment and the mower permits these parts to move relatively when the mower shoes and the attachment supporting wheel are moving over uneven ground. The attachment will aid materially in the efficient operation of the mower, will permit the gathering of short and long grass, and will prevent the loss of grain, due to the movement by the longitudinal conveyor of the uncut grass in the direction of the mower and of the cut grass away from and rearwardly of the mower, the adjustability of this conveyor enabling the attachment to be readily adapted for short or long grass.

As the transverse conveyor may be constantly or intermittently operated, the cut grass may be deposited upon the ground in a windrow or in bunches rearwardly of the tractor, and in view thereof, the windrow or bunches will be out of the path of the machine while the remainder of the grass is being cut. The means for operating the transverse conveyor may be readily actuated to effect the continuous or intermittent operation of this conveyor.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. In a windrow or bunching attachment for a mower, a longitudinal chute extending upwardly and rearwardly from the mower, a conveyor for the chute having the lower end overlying the mower, a shaft journaled on and extending across the rear end of the chute, sprocket wheels fixed to the shaft, arms pivoted to and extending forwardly from the shaft, a second shaft journaled in the front ends of the arms and extending across the chute, sprocket wheels larger than said first sprocket wheels and fixed to said second shaft and overlying the mower, sprocket chains passing about the sprocket wheels, slats connected to the sprocket chains and extending across the bottom of the chute and provided with fingers, means connected to the chute and arms for adjusting the arms upwardly and downwardly with respect to the chute and securing them in adjusted position, a transverse chute located below the rear end of the longitudinal chute, a conveyor for the transverse chute, and means for operating said first shaft and the conveyor.

2. In a windrow or bunching attachment for a mower, a longitudinal chute extending upwardly and rearwardly from the mower, a shaft journaled on and extending across the rear end of the chute, sprocket wheels fixed to the shaft, arms pivoted to and extending forwardly from the shaft, a second shaft journaled in the front ends of the arms and extending across the chute, sprocket wheels larger than said first sprocket wheels and fixed to said second shaft and overlying the mower, sprocket chains passing about the sprocket wheels, slats connected to the sprocket chains and extending across the chute and provided with fingers, shaft extending across transversely of the chute and journaled respectively to the chute and arms and provided at their ends with pivotally connected arms, a lever pivoted to the chute and connected to the shaft arms, means for releasably supporting the lever in adjusted position, a transverse chute located below the rear end of the longitudinal chute, a conveyor for the transverse chute, and means for operating said first shaft and the conveyor.

3. In combination, a tractor having a power take-off shaft, a mower having a finger bar and a cutter bar, means connecting the finger bar to the tractor, means establishing a driving connection between the power take-off shaft and the finger bar, a longitudinal chute pivoted to and extending upwardly and rearwardly from the finger bar, a conveyor for the chute, grass engaging fingers carried by the conveyor, the lower end of the conveyor overlying the finger bar, a transverse chute located below the rear end of the longitudinal chute, a conveyor for the transverse chute, means supporting the transverse chute from the longitudinal chute, a bracket located below the longitudinal chute and secured thereto and to the transverse chute, a caster wheel connected to the bracket at the center of the load of the chutes, and means for establishing a driving connection between the power take-off shaft and the conveyor.

4. In combination, a tractor having a power take-off shaft, a mower having a finger bar and a cutter bar, means connecting the finger bar to the tractor, means establishing a driving connection between the power take-off shaft and the finger bar, a longitudinal chute pivoted to and extending upwardly and rearwardly from the finger bar, a conveyor for the chute, grass engaging fingers carried by the conveyor, one end of the conveyor overlying the finger bar, a transverse chute located below the rear end of the longitudinal chute, a conveyor for the transverse chute, means supporting the transverse chute from the longitudinal chute, a bracket located below the longitudinal chute and secured thereto and to the transverse chute, a caster wheel connected to the bracket at the center of the load of the chutes, a frame carried by the longitudinal chute, a power shaft journaled in the frame, driving means establishing driving connection between the power shaft and the conveyor of the longitudinal chute, means establishing a driving connection between the power shaft and transverse chute and including a clutch, a lever mounted on the tractor, means connecting the lever to the clutch, a universal joint mounted on the tractor and driven from the power take-off shaft, a universal joint mounted on the frame and geared to the back shaft, and a shaft connecting universal joints.

WILLIAM F. SCHRAMM.